US010385525B1

(12) United States Patent
Pongracz (10) Patent No.: US 10,385,525 B1
(45) Date of Patent: Aug. 20, 2019

(54) TEMPORARY TRAFFIC CONTROL ASSEMBLY

(71) Applicant: Daniel M. Pongracz, Gladwin, MI (US)

(72) Inventor: Daniel M. Pongracz, Gladwin, MI (US)

( * ) Notice: Subject to any disclaimer, the term of this patent is extended or adjusted under 35 U.S.C. 154(b) by 0 days.

(21) Appl. No.: 16/123,921

(22) Filed: Sep. 6, 2018

(51) Int. Cl.
| G08G 1/0955 | (2006.01) |
| E01F 9/615 | (2016.01) |
| F16M 13/02 | (2006.01) |
| G09F 9/33 | (2006.01) |
| G09F 19/22 | (2006.01) |

(52) U.S. Cl.
CPC ............. *E01F 9/617* (2016.02); *F16M 13/02* (2013.01); *G08G 1/0955* (2013.01); *G09F 9/33* (2013.01); *G09F 19/22* (2013.01)

(58) Field of Classification Search
CPC ....... E01F 9/0118; E01F 9/0165; E01F 9/617; F16M 13/02; G08G 1/07; G08G 1/0955; G06F 11/30; G09F 9/33; G09F 19/22
See application file for complete search history.

(56) References Cited

U.S. PATENT DOCUMENTS

| 5,257,020 A | 10/1993 | Morse | |
| 6,052,067 A * | 4/2000 | Nuxoll | G08G 1/0955 |
| | | | 340/908 |
| 6,104,313 A * | 8/2000 | Boyd, II | E01F 9/65 |
| | | | 116/63 R |
| 6,150,957 A * | 11/2000 | Henz | G08G 1/095 |
| | | | 340/321 |
| D615,441 S | 5/2010 | Kelley | |
| 7,737,912 B2 | 6/2010 | Graef | |
| 8,164,483 B1 * | 4/2012 | Phillips | E01F 9/681 |
| | | | 116/63 P |
| 9,047,791 B2 | 6/2015 | Cox | |
| 9,082,304 B2 | 7/2015 | Benn | |
| 9,302,617 B2 | 4/2016 | Simmons | |
| 9,601,012 B2 * | 3/2017 | Williams | G08G 1/07 |
| 9,972,205 B2 * | 5/2018 | Beaulieu | G08G 1/0955 |
| 10,249,186 B2 * | 4/2019 | Campbell | G08G 1/08 |
| 2005/0102872 A1 * | 5/2005 | Seguin | E01F 13/06 |
| | | | 40/601 |
| 2011/0012751 A1 | 1/2011 | Jones | |
| 2012/0188146 A1 * | 7/2012 | van Zyl | G06F 3/147 |
| | | | 345/2.1 |

(Continued)

*Primary Examiner* — An T Nguyen (57) ABSTRACT

A temporary traffic control assembly includes a traffic barrier that is positioned in a construction zone of a roadway. A mount is coupled to the traffic barrier and a motor is coupled to the mount. A pole is slidably positioned on the motor such that the motor selectively rotates the pole. A display is coupled to the pole such that the display is visible to drivers on the roadway. The display displays indicia comprising traffic information for the drivers. The display is suspended over the roadway when the motor rotates the pole into a displaying position. Moreover, the display is swung across the traffic barrier when the motor rotates the pole into a maintenance position. In this way a worker standing behind the traffic barrier can manipulate the pole and the display without being exposed to traffic on the roadway. A remote control is manipulated by a user for remotely controlling operational parameters of the motor and the display.

6 Claims, 6 Drawing Sheets

(56) References Cited

U.S. PATENT DOCUMENTS

| | | | | |
|---|---|---|---|---|
| 2013/0106619 A1* | 5/2013 | Williams | ............... | G08G 1/07 |
| | | | | 340/908 |
| 2013/0314255 A1* | 11/2013 | Benn | ............... | G08G 1/0955 |
| | | | | 340/908 |
| 2014/0039837 A1* | 2/2014 | Hart | ............... | G06F 11/30 |
| | | | | 702/188 |
| 2015/0240988 A1* | 8/2015 | White | ............... | F16M 13/02 |
| | | | | 248/552 |
| 2017/0154524 A1* | 6/2017 | Beaulieu | ............... | G08G 1/0955 |
| 2018/0144628 A1* | 5/2018 | Nicholson | ............... | E01F 9/65 |

* cited by examiner

TEMPORARY TRAFFIC CONTROL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to traffic control devices and more particularly pertains to a new traffic control device for communicating messages to drivers in a construction zone.

BRIEF SUMMARY OF THE INVENTION

An embodiment of the disclosure meets the needs presented above by generally comprising a traffic barrier that is positioned in a construction zone of a roadway. A mount is coupled to the traffic barrier and a motor is coupled to the mount. A pole is slidably positioned on the motor such that the motor selectively rotates the pole. A display is coupled to the pole such that the display is visible to drivers on the roadway. The display displays indicia comprising traffic information for the drivers. The display is suspended over the roadway when the motor rotates the pole into a displaying position. Moreover, the display is swung across the traffic barrier when the motor rotates the pole into a maintenance position. In this way a worker standing behind the traffic barrier can manipulate the pole and the display without being exposed to traffic on the roadway. A remote control is manipulated by a user for remotely controlling operational parameters of the motor and the display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new traffic control device embodying the principles and concepts of an embodiment of the disclosure and generally designated by the reference numeral 10 will be described.

As best illustrated in FIGS. 1 through 6, the temporary traffic control assembly 10 generally comprises a traffic barrier 12 that is positioned in a construction zone of a roadway 14. The traffic barrier 12 has a top side 16 and the traffic barrier 12 may be a guard rail, a concrete wall and any other type of traffic barrier 12 that can be found in construction zones on roadways. Additionally, the roadway 14 may be a state highway, an interstate highway and any other type of roadway 14 on which motorized vehicle drive.

A mount 18 is provided and the mount 18 is coupled to the traffic barrier 12. The mount 18 has a central panel 20 extending between a pair of lateral panels 22 and the lateral panels 22 are spaced apart from each other to define a space 24 between the lateral panels 22. The traffic barrier 12 is positioned in the space 24 having the central panel 20 lying on the top side 16 of the traffic barrier 12. The central panel 20 has a plurality of fastener apertures 26 extending therethrough and fasteners are extended through the fastener aperture to engage the traffic barrier 12 for retaining the mount 18 on the traffic barrier 12. The fasteners may be screws, bolts and any other type of mechanical fastener.

A motor 28 is coupled to the mount 18 and the motor 28 is positioned on and extends upwardly from the central panel 20. The motor 28 includes a shaft 30 extending upwardly from the motor 28 and the shaft 30 is rotated about a longitudinal axis in the shaft 30 when the motor 28 is turned on. The motor 28 may be an electrical motor 28 or the like and the shaft 30 includes a first electrical contact 32. The first electrical contact 32 is electrically coupled to the motor 28.

A pole 34 is slidably positioned on the motor 28 such that the motor 28 selectively rotates the pole 34. The pole 34 has a first end 36 and a second end 38 and the pole 34 has a bend 40 between the first 36 and second 38 ends to define a lower portion 41 of the pole 34 that is oriented perpendicular with an upper portion 42 of the pole 34. The first end 36 is open and the first end 36 insertably receives the shaft 30 on the motor 28 having the lower portion 41 of the pole 34 being vertically oriented and having the upper portion 42 of the pole 34 being horizontally oriented. A second electrical contact 46 is positioned within the first end 36 of the pole 34 and the second electrical contact 46 is in electrical communication with the first electrical contact 32 when the shaft 30 is positioned in the first end 36 of the pole 34. Each of the upper 38 and lower 40 portions of the pole 34 may include plurality of slidable sections such that each of the upper 38 and lower 40 portions of the pole 34 has a telescopically adjustable length.

A display 48 is coupled to the pole 34 such that the display 48 is visible to drivers on the roadway 14. The display 48 displays indicia 50 comprising traffic information for the drivers. The display 48 is suspended over the roadway 14 when the motor 28 rotates the pole 34 into a displaying position. Thus, the display 48 is positioned for optimum visibility for the drivers.

The display 48 may be an LED display or any other type of electronic display that is capable of displaying any selected message or image. Additionally, the display 48 is weatherproof such that the display 48 can be employed outdoors without damaging the display 48. The display 48 is swung across the traffic barrier 12 when the motor 28 rotates the pole 34 into a maintenance position. In this way a worker who is standing behind the traffic barrier 12 can manipulate the pole 34 and the display 48 without being exposed to traffic on the roadway 14. Thus, worker is protected from being struck by the traffic when the display 48 is being maintained.

A pair of suspensions 52 is provided and each of the suspensions 52 is coupled between the upper portion 42 of the pole 34 and the display 48. Thus, the display 48 is suspended from the upper portion 42 of the pole 34. A control circuit 54 is positioned within the display 48 and the display 48 is electrically coupled to the control circuit 54. A conductor 56 is electrically coupled between the control circuit 54 and the second contact 46. Additionally, the motor 28 is in electrical communication with the display 48 when the pole 34 is positioned on the motor 28 via the first 32 and second 46 electrical contacts.

An electronic memory 58 is positioned within the display 48 and the electronic memory 58 is electrically coupled to the control circuit 54. The electronic memory 58 stores data comprising selected indicia 50 to be displayed on the display 48. A receiver 60 is positioned within the display 48 and the receiver 60 is electrically coupled to the control circuit 54. The receiver 60 may be a radio frequency receiver or the like.

A power supply 62 is positioned within the display 48, the power supply 62 is electrically coupled to the control circuit 54 and the power supply 62 comprises at least one battery. A remote control 64 is provided that can be manipulated by a worker. The remote control 64 includes a transmitter 66, control buttons and other components common to electronic remote control 64s. The transmitter 66 is in wireless electrical communication with the receiver 60 for remotely controlling the motor 28 and for remotely programming the data into the electronic memory 58. In this way the indicia 50 displayed on the display 48 can be remotely modified, thereby inhibiting the worker from needing to expose themselves to the dangers of traffic in the construction area.

Figure 1:
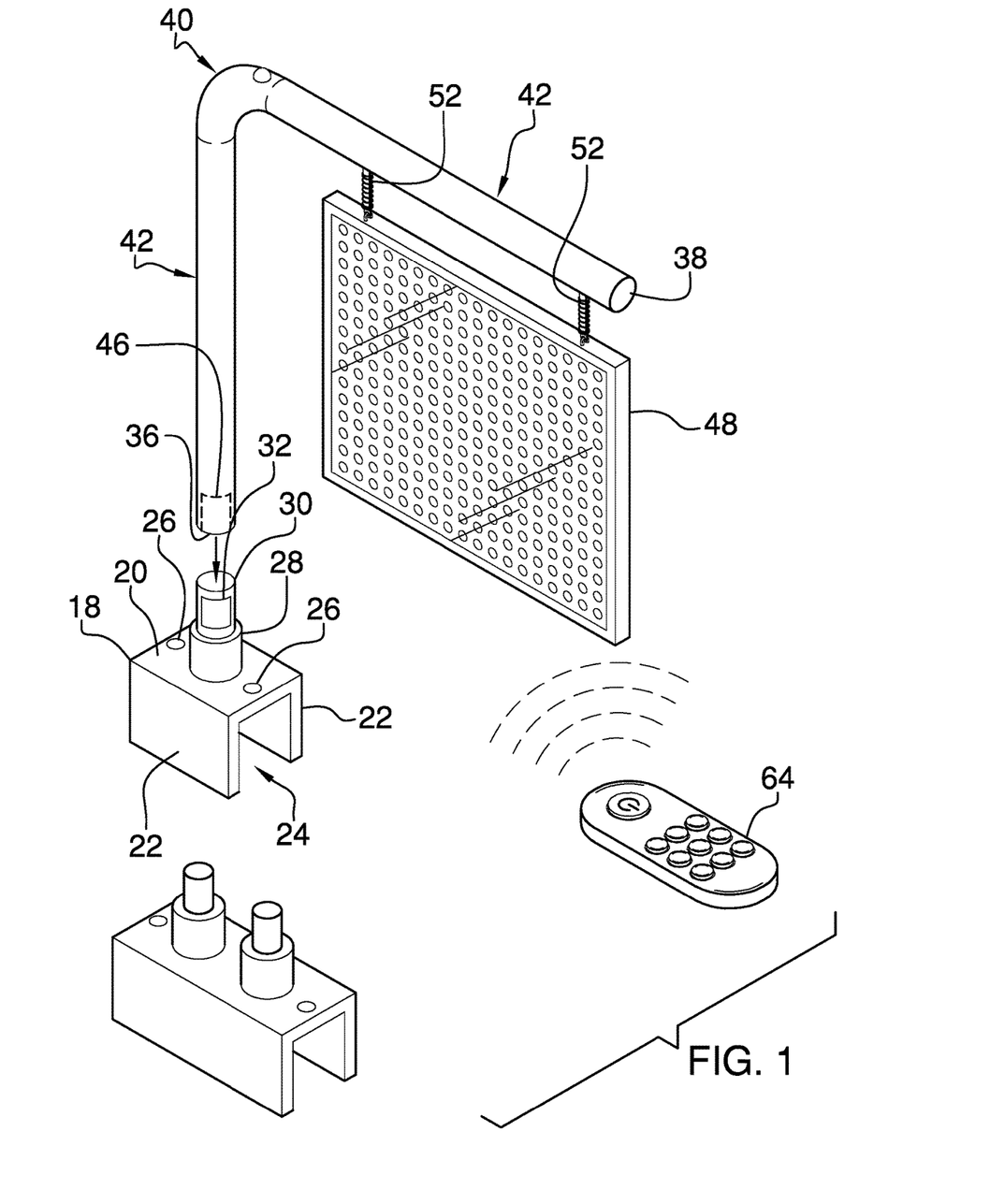
FIG. 1 is a perspective view of a temporary traffic control assembly according to an embodiment of the disclosure.
Figure 2:
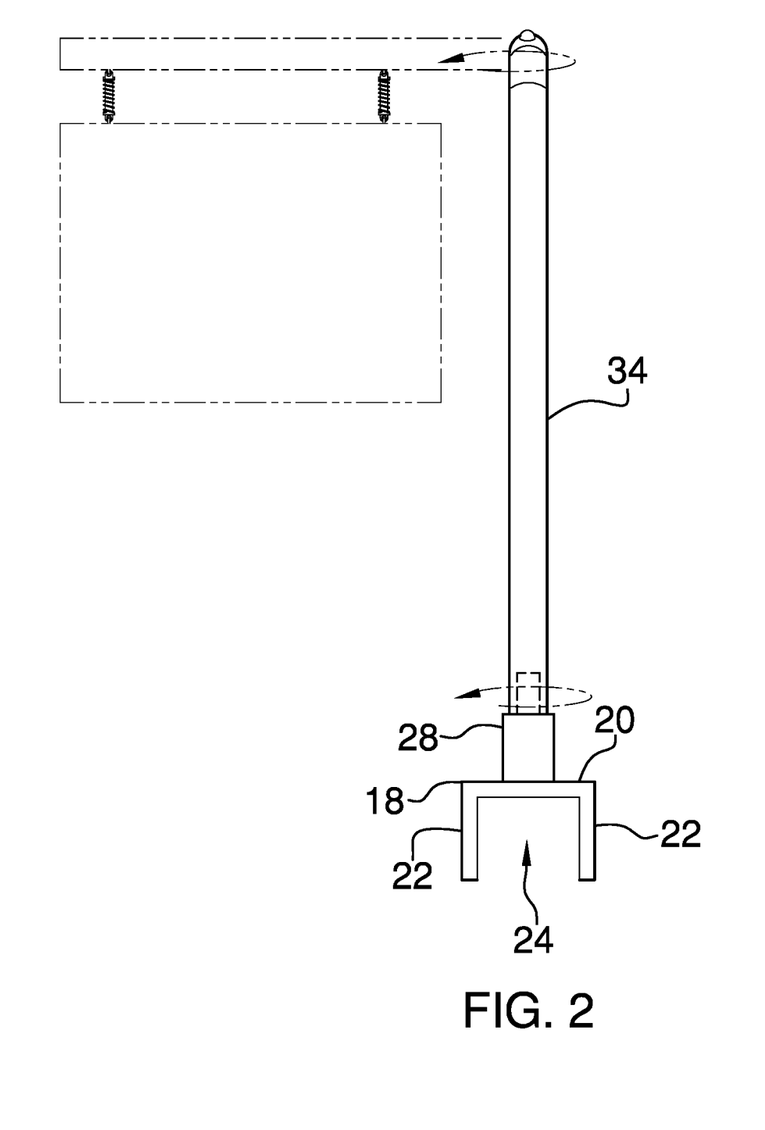
FIG. 2 is a right side view of an embodiment of the disclosure.
Figure 3:
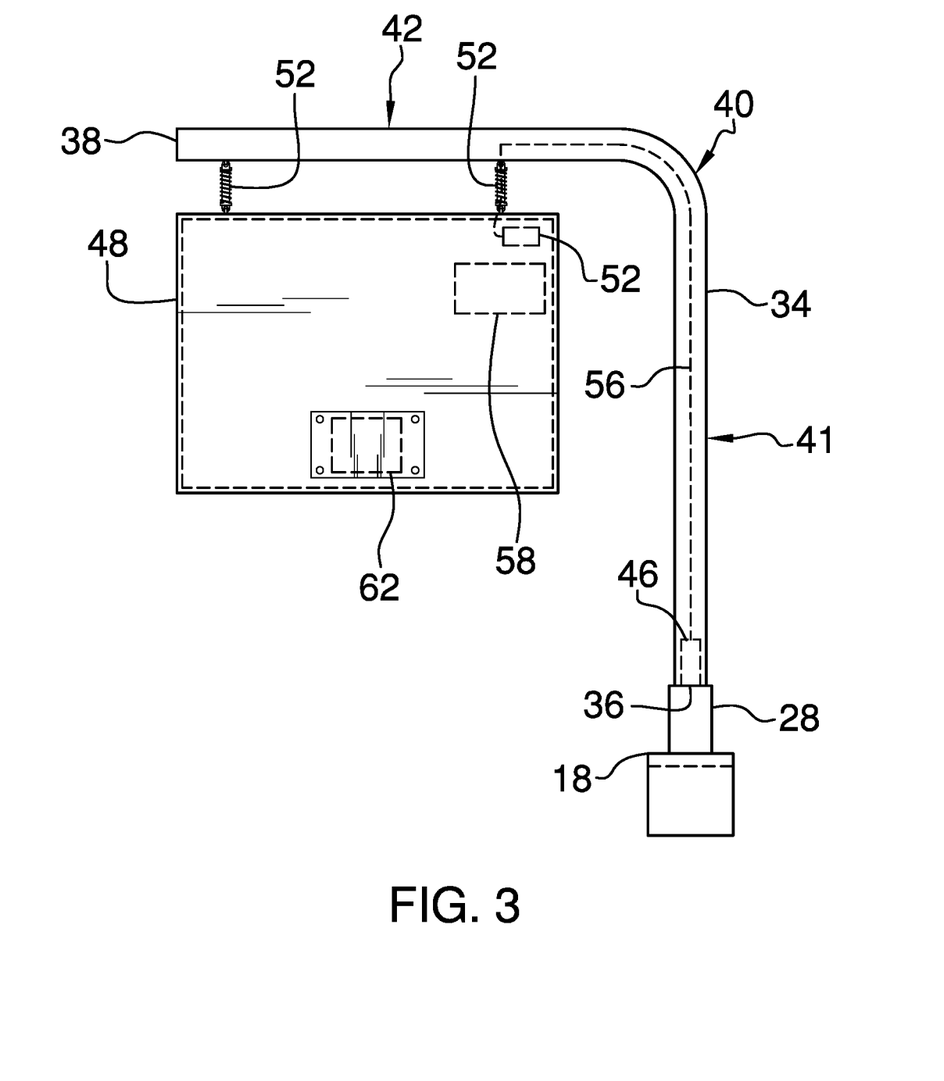
FIG. 3 is a back phantom view of an embodiment of the disclosure.
Figure 4:
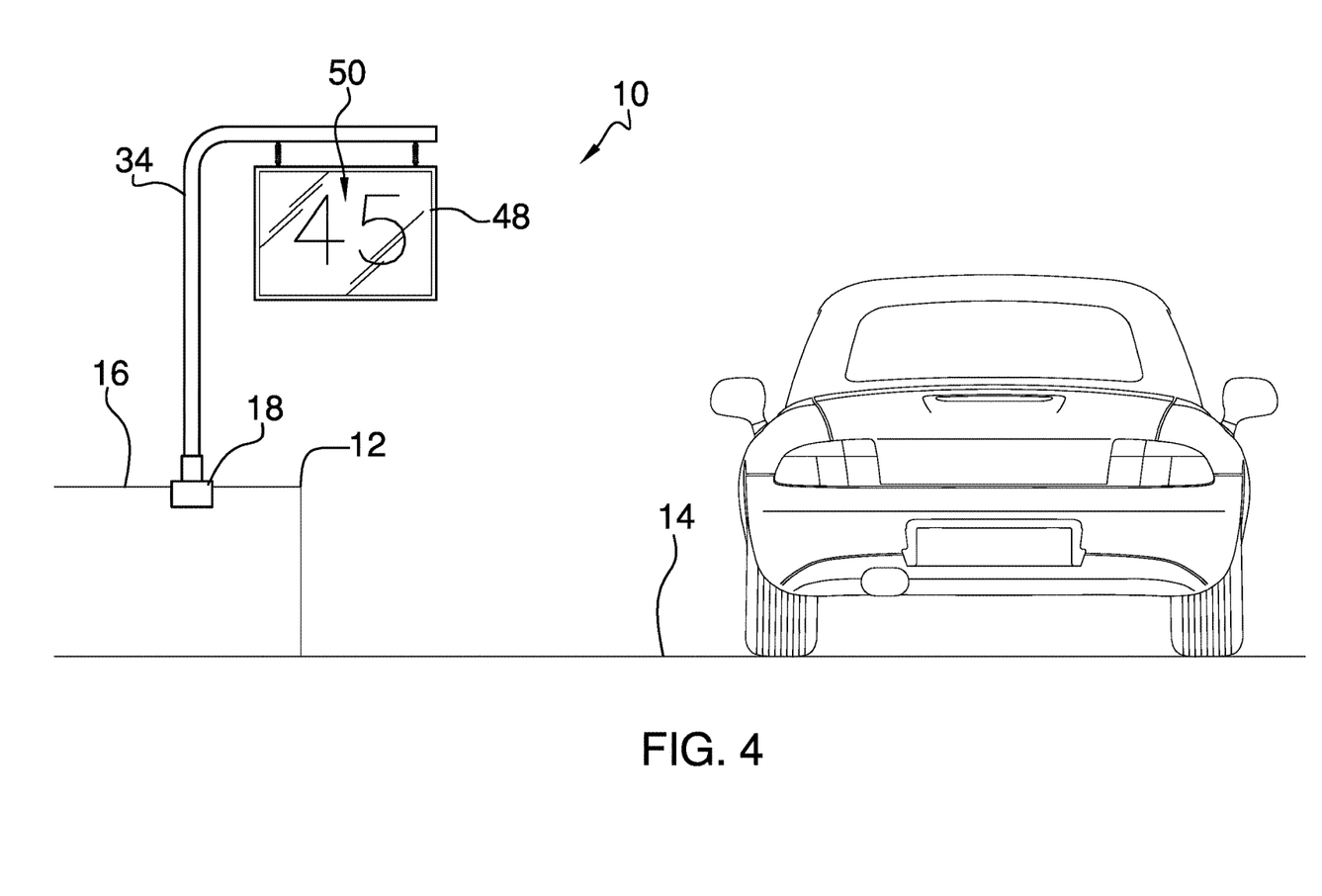
FIG. 4 is a perspective in-use view of an embodiment of the disclosure.
Figure 5:
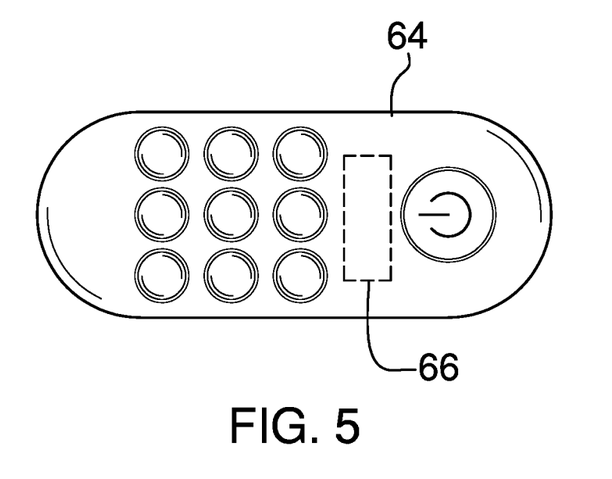
FIG. 5 is a perspective view of a remote control of an embodiment of the disclosure.
Figure 6:
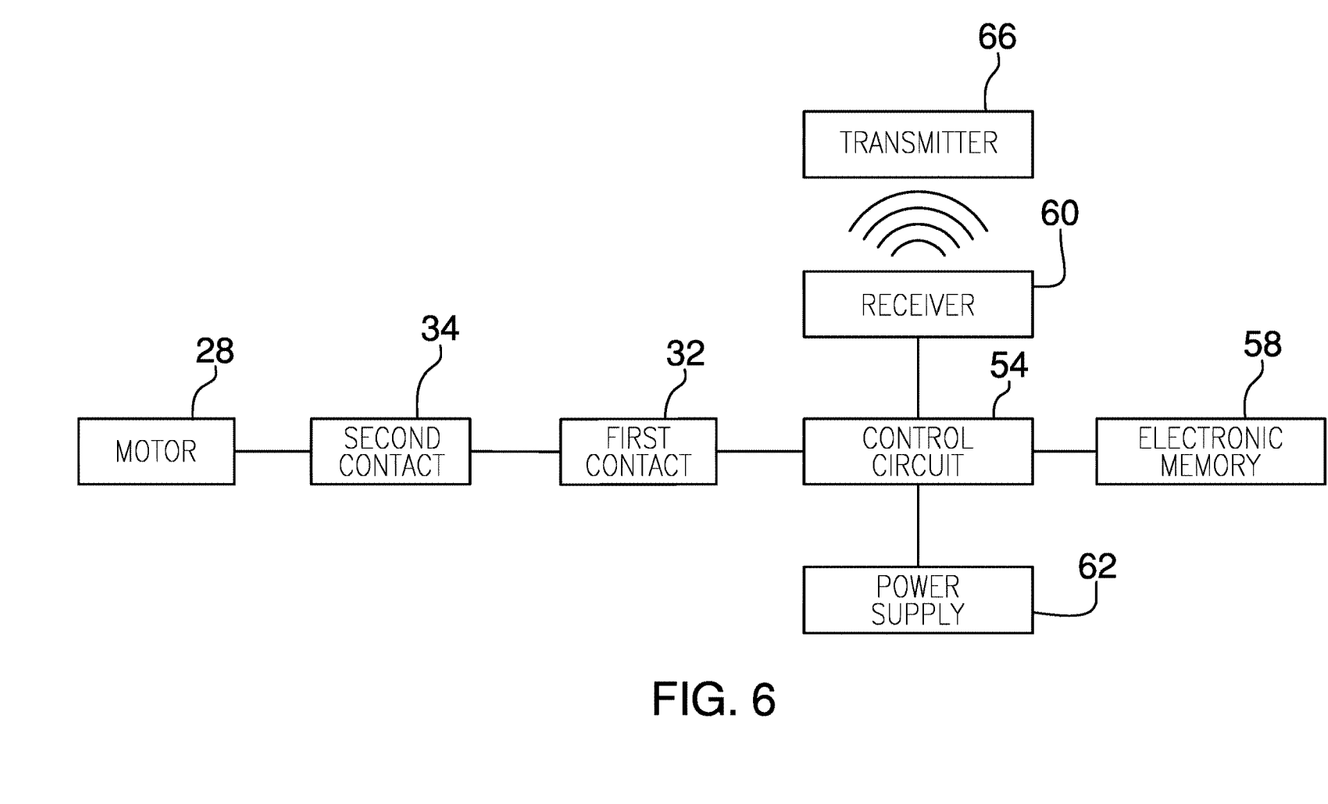
FIG. 6 is a schematic view of an embodiment of the disclosure.

In use, the mount 18 is fastened to the barrier and the first end 36 of the pole 34 is positioned on the shaft 30. The remote control 64 is manipulated to program selected indicia 50 into the electronic memory 58, such as the speed limit in the construction zone, a safety message and any other conceivable indicia 50. Additionally, the motor 28 is actuated to rotate the pole 34 thereby facilitating the display 48 to be suspended over the roadway 14. The motor 28 is actuated to rotate the pole 34 thereby facilitating the display 48 to be swung over the barrier. In this way the worker can access the display 48 for maintenance or the like while being protected by the barrier. As shown in FIG. 1, the mount 18 may include a pair of the motors 28 for positioning a pair of poles 34 on the mount 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A temporary traffic control assembly being configured to be mounted to a barrier in a construction zone thereby facilitating a worker to be protected by the barrier when adjusting, installing or removing said assembly, said assembly comprising:

a traffic barrier being positioned in a construction zone of a roadway, said traffic barrier having a top side;

a mount being coupled to said traffic barrier, said mount having a central panel extending between a pair of lateral panels, said lateral panels being spaced apart from each other to define a space between said lateral panels, said traffic barrier being positioned in said space having said central panel lying on said top side of said traffic barrier, said central panel having a plurality of fastener apertures extending therethrough for having fasteners extended therethrough and engaging said traffic barrier to retain said mount on said traffic barrier;

a motor being coupled to said mount, said motor being positioned on and extending upwardly from said central panel, said motor including a shaft extending upwardly therefrom, said shaft being rotated about a longitudinal axis in said shaft when said motor is turned on;

a pole being slidably positioned on said motor such that said motor selectively rotates said pole;

a display being coupled to said pole wherein said display is configured to be visible to drivers on the roadway, said display displaying indicia comprising traffic information for the drivers, said display being suspended over the roadway when said motor rotates said pole into a displaying position, said display being swung across said traffic barrier when said motor rotates said pole into a maintenance position wherein a worker standing behind said traffic barrier can manipulate said pole and said display without being exposed to traffic on the roadway; and a remote control being manipulated by a user for remotely controlling operational parameters of said motor and said display.

2. The assembly according to claim 1, wherein said pole has a first end and a second end, said pole having a bend between said first and second ends to define a lower portion of said pole being oriented perpendicular with an upper portion of said pole, said first end being open, said first end insertably receiving said shaft having said lower portion of said pole being vertically oriented and having said upper portion of said pole being horizontally oriented.

3. A temporary traffic control assembly being configured to be mounted to a barrier in a construction zone thereby facilitating a worker to be protected by the barrier when adjusting, installing or removing said assembly, said assembly comprising:

a traffic barrier being positioned in a construction zone of a roadway;

a mount being coupled to said traffic barrier;

a motor being coupled to said mount;

a pole being slidably positioned on said motor such that said motor selectively rotates said pole;

a display being coupled to said pole wherein said display is configured to be visible to drivers on the roadway, said display displaying indicia comprising traffic information for the drivers, said display being suspended over the roadway when said motor rotates said pole into a displaying position, said display being swung across said traffic barrier when said motor rotates said pole into a maintenance position wherein a worker standing behind said traffic barrier can manipulate said pole and said display without being exposed to traffic on the roadway;

a remote control being manipulated by a user for remotely controlling operational parameters of said motor and said display;

a control circuit being positioned within said display, said display being electrically coupled to said control circuit, said motor being in electrical communication with said display when said pole is positioned on said motor;

an electronic memory being positioned within said display, said electronic memory being electrically coupled to said control circuit, said electronic memory storing data comprising selected indicia to be displayed on said display; and a receiver being positioned within said display, said receiver being electrically coupled to said control circuit.

4. The assembly according to claim 3, further comprising a power supply being positioned within said display, said power supply being electrically coupled to said control circuit, said power supply comprising at least one battery.

5. The assembly according to claim 3, wherein said remote control includes a transmitter, said transmitter being in wireless electrical communication with said receiver for remotely controlling said motor and for remotely programming said data into said electronic memory.

6. A temporary traffic control assembly being configured to be mounted to a barrier in a construction zone thereby facilitating a worker to be protected by the barrier when adjusting, installing or removing said assembly, said assembly comprising:

a traffic barrier being positioned in a construction zone of a roadway, said traffic barrier having a top side;

a mount being coupled to said traffic barrier, said mount having a central panel extending between a pair of lateral panels, said lateral panels being spaced apart from each other to define a space between said lateral panels, said traffic barrier being positioned in said space having said central panel lying on said top side of said traffic barrier, said central panel having a plurality of fastener apertures extending therethrough for having fasteners extended therethrough and engaging said traffic barrier to retain said mount on said traffic barrier;

a motor being coupled to said mount, said motor being positioned on and extending upwardly from said central panel, said motor including a shaft extending upwardly therefrom, said shaft being rotated about a longitudinal axis in said shaft when said motor is turned on;

a pole being slidably positioned on said motor such that said motor selectively rotates said pole, said pole having a first end and a second end, said pole having a bend between said first and second ends to define a lower portion of said pole being oriented perpendicular with an upper portion of said pole, said first end being open, said first end insertably receiving said shaft having said lower portion of said pole being vertically oriented and having said upper portion of said pole being horizontally oriented;

a display being coupled to said pole wherein said display is configured to be visible to drivers on the roadway, said display displaying indicia comprising traffic information for the drivers, said display being suspended over the roadway when said motor rotates said pole into a displaying position, said display being swung across said traffic barrier when said motor rotates said pole into a maintenance position wherein a worker standing behind said traffic barrier can manipulate said pole and said display without being exposed to traffic on the roadway;

a pair of suspensions, each of said suspensions being coupled between said upper portion of said pole and said display thereby suspending said display from said upper portion of said pole;

a control circuit being positioned within said display, said display being electrically coupled to said control circuit, said motor being in electrical communication with said display when said pole is positioned on said motor;

an electronic memory being positioned within said display, said electronic memory being electrically coupled to said control circuit, said electronic memory storing data comprising selected indicia to be displayed on said display;

a receiver being positioned within said display, said receiver being electrically coupled to said control circuit; and a power supply being positioned within said display, said power supply being electrically coupled to said control circuit, said power supply comprising at least one battery; and a remote control being manipulated by a user, said remote control including a transmitter, said transmitter being in wireless electrical communication with said receiver for remotely controlling said motor and for remotely programming said data into said electronic memory.

* * * * *